(12) United States Patent
Norman et al.

(10) Patent No.: US 6,657,977 B1
(45) Date of Patent: Dec. 2, 2003

(54) RADIO WITH BURST EVENT EXECUTION APPARATUS AND METHOD THEREFORE

(75) Inventors: Oded Norman, Pardessiya (IL); Moshe Refaeli, Tel Aviv (IL); Yoram Salant, Rosh-Haain (IL); Jean M. Khawand, Miami, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/276,864

(22) Filed: Mar. 26, 1999

(30) Foreign Application Priority Data

Apr. 24, 1998 (EP) .............................................. 98107472

(51) Int. Cl.[7] ............................................. H04B 7/005
(52) U.S. Cl. ....................................... 370/305; 370/350
(58) Field of Search ................................ 455/502, 517; 375/356, 354; 712/245, 223, 227; 370/503, 350

(56) References Cited

U.S. PATENT DOCUMENTS

| | | | |
|---|---|---|---|
| 4,771,377 A | | 9/1988 | Wiser et al. ................. 364/200 |
| 5,185,880 A | * | 2/1993 | Ueda et al. .................. 713/500 |
| 5,481,744 A | * | 1/1996 | Hoenninger, III ........... 712/227 |
| 5,729,543 A | | 3/1998 | Weigand et al. ............. 370/347 |
| 1,237,085 A1 | * | 5/2001 | Burns et al. ................. 712/223 |
| 6,453,424 B1 | * | 9/2002 | Janniello ..................... 713/500 |

FOREIGN PATENT DOCUMENTS

| | | | | |
|---|---|---|---|---|
| EP | 0401 763 | | 12/1990 | .............. G06F/1/04 |
| EP | 0 959 575 A1 | * | 11/1999 | .............. H04J/3/06 |

* cited by examiner

*Primary Examiner*—Kenneth Vanderpuye

(57) ABSTRACT

A radio (10) with a burst event execution and time synchronization apparatus (16) executes instructions during and after performing time synchronization between a mobile unit and a base station. Both base station (12) and mobile radio (10) have internal timer units (26, 16). Mobile radio (10) timing unit (16) is reset during synchronization between the mobile radio (10) and the base station (12). The control unit (18) writes instructions I(i) including their execution times T(i) to a memory bank (42) within the mobile radio (10). Execution logic (32) within mobile radio (10) executes instruction operands O(i) when execution time T(i) is equal or smaller then a timing count signal received from the timer unit (16). When a time synchronization reset causes the radio (10) time count to jump past queued instructions they can be executed immediately in a burst or delayed until the next communication frame.

11 Claims, 3 Drawing Sheets

RADIO WITH BURST EVENT EXECUTION APPARATUS AND METHOD THEREFORE

FIELD OF THE INVENTION

This invention concerns a radio having a burst event execution apparatus and a method.

BACKGROUND OF THE INVENTION

In cellular communication, mobile radios (i.e.—ìradioî) and radio base stations (i.e.—ìbaseî) exchange data and control signals. The base can serve more than one radio, and several bases can serve a plurality of radios in a defined geographic area. A single radio generally communicates with one base at a time. The radio and base need to be time synchronized in order for the transmitted and received signals to be properly interpreted by the radio and the base.

In both radio and base there are timing units for timing events executed within the radio and the base. Such timing units can include one or more counters. The counters are used to time various events occurring within the radio and base and for measuring time intervals. For example, one counter can count the number of communication frames being exchanged between base and radio, and another counter can be used to trigger events that occur within a communication frame. In order for the radio and base to function properly, the timing counters in the radio and the base should be periodically synchronized.

Offset between the timing counters of the radio and base can occur, for example, as a result of a handover of a radio between two base stations or from movement of the radio which changes the propagation time of the signals exchanged between the base and radio. In order to synchronize the timing counter of the mobile radio and the timing counter of base station, timing signals are periodically sent by one to the other and an offset is calculated and one or both timing counters adjusted. Usually the timing counter in the mobile radio is adjusted.

Prior art arrangements for synchronizing a radio timing counters have several disadvantages. Resetting the timing counter can interfere with normal operation of the radio, especially when the timing reset occurs while the timing unit is in the middle of scheduling or triggering some operation within the mobile radio.

If, for example, at time T1, the timing counter is reset to a value which is associated with time T6, and at times T2,T3,T4,T5 a plurality of instructions were to be executed, wherein T1<T2<T3<T4<T5<T6, then these instructions are executed only in the next communication frame, resulting in an undesirable delay.

Accordingly there is a need to provide an improved means and method which mitigates or avoids these and other deficiencies of the prior art.

SUMMARY OF THE INVENTION

The problem underlying the invention is basically solved by applying the features laid down in the independent claims. Preferred embodiments are given in the dependent claims.

An advantage of the present invention is that it provides a mobile radio with accurate synchronization while minimizing or avoiding conflicts with other timed operations of the radio.

DETAILED DESCRIPTION OF THE DRAWINGS

Figure 1:
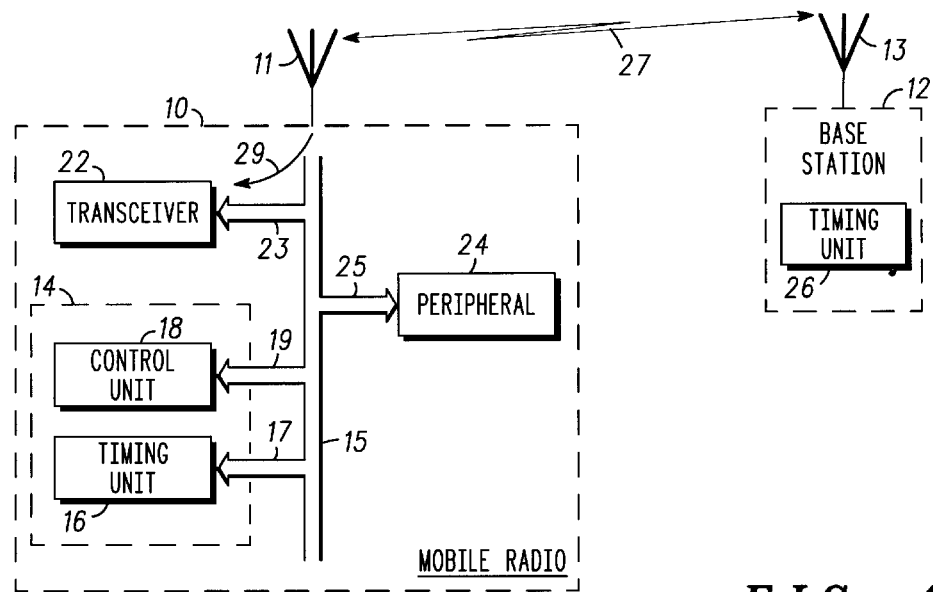
FIG. 1 is a simplified schematic diagram of a radio having a burst event execution and synchronization apparatus, according a preferred embodiment of the present invention.

FIG. 1 is a simplified schematic diagram of a radio 10 having a burst event execution and synchronization apparatus 14, according a preferred embodiment of the present invention. Radio 10 operates in radio communication with base station 12. Apparatus 14 includes timing unit 16 and control unit 18. Mobile radio 10 also has transceiver 22, optional peripheral 24, and antenna 11. Control unit 18 is conveniently a processor which controls the operation of radio 10 as a whole. Transceiver 22 and antenna 11 are conventional. Timing unit 16, control unit 18, transceiver 22 and peripheral 24 are conveniently coupled by bus 15 through bus connections 17, 19, 23 and 25 respectively, although other means well known in the art for coupling such elements can also be used. Base station 12 has timing unit 26 and antenna 13 and other conventional elements not depicted but well known in the art.

For purposes of explanation, it is assumed that base station 12 sends timing synchronization signal 27 to mobile unit 10, but this is not essential and the synchronization signal can be sent the other way. Synchronization signal 27 is coupled within mobile unit 10 as indicated by arrow 29 to transceiver 22 and thence by bus 15 to control unit 18 and timing unit 16. Control unit 18 and timing unit 16 cooperate as is more fully explained in connection with the figures that follow to correct any discrepancies between timing units 26 and 16 as communicated by signals 27, 29 without interfering with other operations of the radio.

Although the present invention is illustrated for the situation where mobile unit 10 is exchanging information with base station 12, persons of skill in the art will understand that base station 12 can also be another mobile unit and that mobile unit 10 can also be another base station, that is, elements 10 and 12 can be any kind of radios between which synchronization of event counters or internal clocks or both need to be maintained. As used herein the words ìmobile radioî, ìradioî and ìbase stationî are intended to include such variations.

Figure 2:
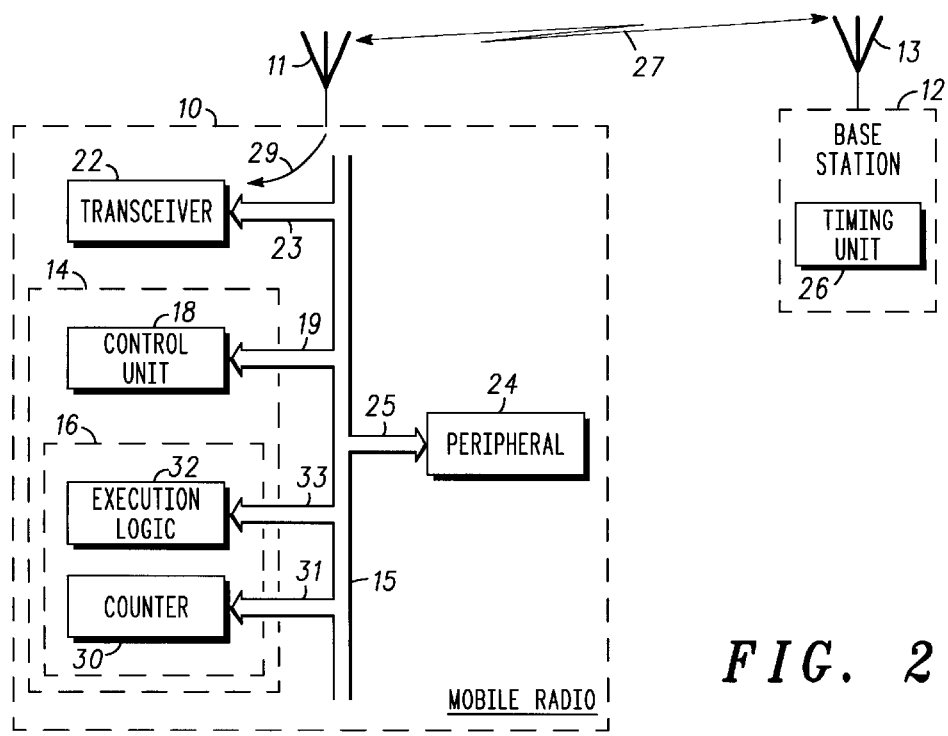
FIG. 2 is a simplified schematic diagram of the radio of FIG. 1 showing further details, according to a first embodiment.

FIG. 2 is a simplified schematic diagram of the radio of FIG. 1 showing further details, according to a first embodiment. The same reference numbers are used to identify like elements in the figures. In FIG. 2, timing unit 16 is illustrated as comprising counter 30 coupled to bus 15 by bus connection 31 and execution logic 32 coupled to bus 15 by bus connection 33. The cooperation of these elements is more fully explained in connection with FIGS. 4–6.

Figure 3:
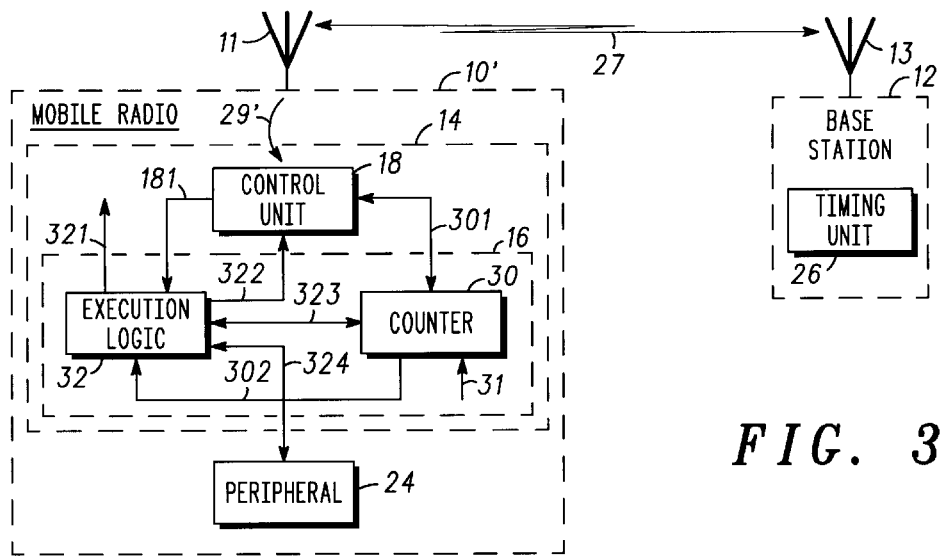
FIG. 3 is a simplified schematic diagram of a portion of the radio of FIG. 1 showing further details,according to a second embodiment.

FIG. 3 is a simplified schematic diagram of a portion of radio 10' analogus to radio 10 of FIG. 2 but showing further details, according to a second embodiment. For convenience of explanation, transceiver 22 is omitted from radio portion 10$i$ of FIG. 3.

FIG. 3 illustrates the arrangement wherein counter 30, execution logic 32 control unit 18 and peripheral 24 are coupled independently of bus 15. Either arrangement is useful. In FIG. 3, control unit 18 receives timing synchronization signal 29$i$ analogous to signal 29 of FIGS. 1–2. Control unit 18 has outputs 181 and 183 coupled to execution logic 32. Execution logic 32 has output 321 analogous to bus connection 33 for coupling to other portions of radio 10 not shown in FIG. 3. Execution logic 32 has output 322 coupled to control unit 18 and output 323 coupled to counter 30. Counter 30 has output 301 coupled to control unit 18 and output 302 coupled to execution logic 32. Connection 324 analogous to bus connection 25 couples peripheral 24 to and from execution logic 32. Counter 30 receives clock input 31 derived from a system master clock (not shown). Clock input 31 causes counter 30 to increment (or decrement) by one count for each clock input signal.

While radio 10, 10' is illustrated herein as having only one timing unit 16 and one counter 30, persons of skill in the art will understand that radio 10, 10' can have multiple timing units 16 or multiple counters 30 or both which can be synchronized with related timing units and counters in base station 12, and that the illustration of only one timing unit and one counter in radio 10, 10' is merely for convenience of explanation. For convenience of explanation, references to radio "10" is intended to include "10'".

Control unit 18 loads a sequence of instructions into execution logic 32 that it is desired that radio 10 execute, for example, during a communication signal frame. Execution logic 32 contains a memory store for receiving these instructions. Associated with each instruction is a time value (e.g., counter count) when the particular instruction is to be executed, e.g., within a communication frame. However, such instructions are not limited to use within an individual frame.

Radio 10 is conveniently synchronized by resetting the counter 30. The counter is preferably loaded with a correction value which is equal to the sum of the previous value of counter 30 and the offset between the timing unit 16 of radio 10 and timing unit 26 of the base 12.

During communication frames in which counter 30 is not reset, execution logic 32 sequentially executes each instruction at the time associated with each instruction, time being measured by counter 30. During a communication frame in which counter 30 is reset, and before counter 30 is reset, execution logic 32 sequentially executes each instruction at the time associated with each instruction, time being measured by counter 30. After counter 30 is reset, execution logic 32 will execute the remaining instructions in one of several modes, wherein the mode is determined by a control signal sent from control unit 18 to execution logic 32.

In a first mode, execution logic 32 executes each instruction at the time T(i) associated with it. In a second mode, execution logic 32 executes each instruction at a time T(i) associated with the instruction if the time associated with the instruction is equal or smaller to the timing count signal from counter 30. If the time T(i) associated with an instruction is smaller then the timing count signal from the counter, it is executed immediately.

In the second mode, as long as counter 30 is not reset, execution logic 32 executes each instruction at the time T(i) associated with the instruction. After counter 30 is reset some of the instructions can have execution times T(i) which are smaller then the timing count value, and these instructions can be executed in a burst; each instruction executed immediately and in a consecutive order until there are no more instructions to be executed, or until the time associated with an instruction is greater then the timing count signal value from counter 30. Often, an execution time T(i) associated with an instruction is smaller then the timing count value as a result of a reset of counter 30. A reset of counter 30 can change the value of counter 30 resulting in a new timing count signal value which is greater then the time T(i) associated with a plurality of, as yet unexecuted, instructions. These are referred to as "skipped instructions".

For example, at time T1, counter 30 is reset to a value which is associated with time T6. But a servies of instructions were originally scheduled to be executed at times T2,T3,T4,T5 where T1<T2<T3<T4<T5<T6. Then, if execution logic 32 works in the second mode, it will execute the skipped instructions in a consecutive order, immediately after counter 30 is reset from T1 to T6. The cooperation of the elements in FIG. 3 is explained more fully in connection with FIGS. 4–6.

Figure 4:
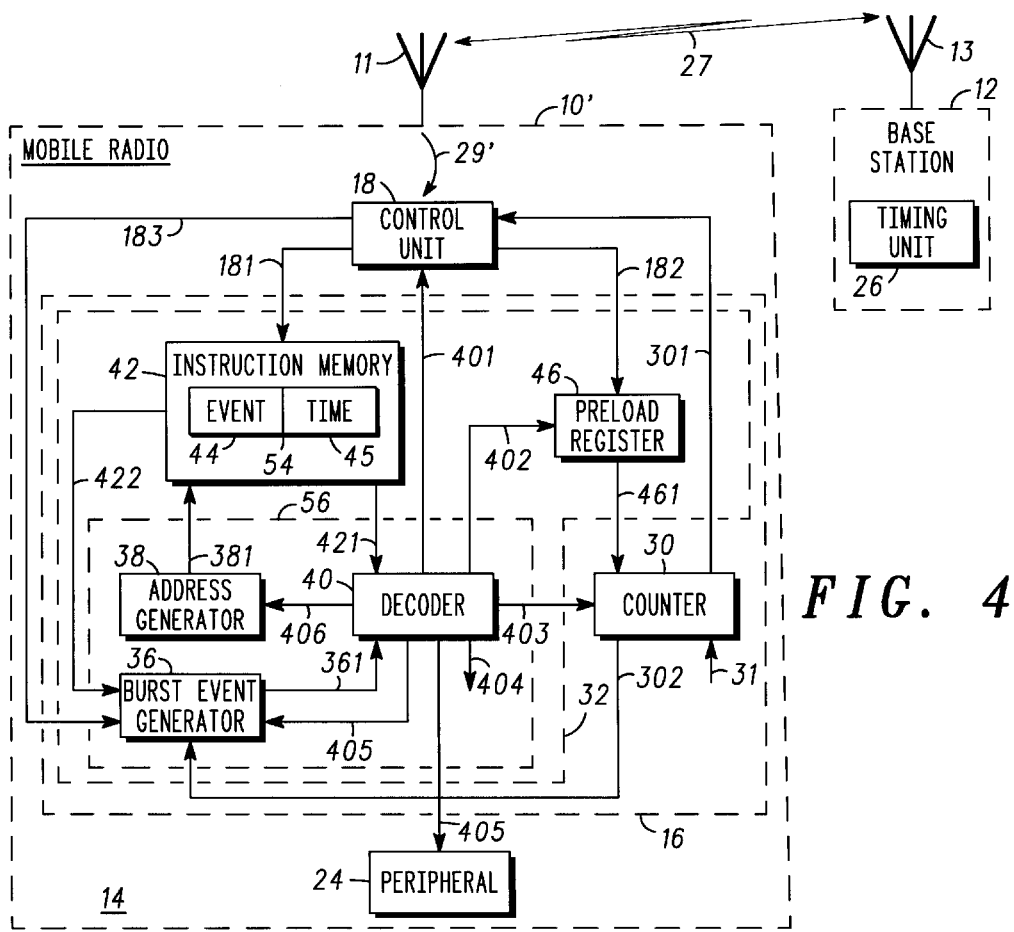
FIG. 4 is a simplified schematic diagram of a portion of the radio of FIG. 3 showing still further details.

FIG. 4 is a simplified schematic diagram of a portion of the radio 10 of FIG. 3 showing still further details. The portion includes apparatus 14, comprising timing unit 16 and execution logic 32 of radio portion 10$i$ of FIG. 3, showing still further detail. The same reference numbers are used to identify the same elements in the figures.

Execution logic 32 comprises burst event generator 36, address generator 38, decoder 40, preload register 46 and instruction memory 42. Peripheral 24 and counter 30 are also shown. Instruction memory 42 has instructions I(i) stored therein. Each instruction I(i) comprises EVENT operand O(i) stored in memory portion 44 and execute TIME T(i) stored in memory portion 45. TIME T(i) specifies the execution time (e.g., in counts of counter 30) of operand O(i). When memory 42 is addressed, both the EVENT operand and its execution TIME are stored or retrieved, as the case may be. Control unit 18 provides output 181 to memory 42 to load instructions I(i).

Burst event generator 36 is coupled to output 183 of control unit 18, so that control unit 18 can send a control signal to burst event generator 36 which determines in which of two modes of operations burst event generator 36 will work, as explained previously.

Execution logic 32 operates under the control of control unit 18 which supplies EVENT and TIME instructions to memory 42, and receives via line 401 feedback on what instructions have been decoded by decoder 40. Memory 42 provides output 421 to decoder 40 and output 422 to burst event generator 36. Memory 42 also receives output 381 from address generator 38. While memory 42 is depicted here as being a single memory with EVENT and TIME portions 44, 45, this is merely for convenience of explanation and, as those of skill in the art will understand based on the teachings herein, that multiple memories can also be used.

Decoder 40 receives signals from memory 42 on line 421 and from burst event generator 36 on line 361 and provides output 401 to control unit 18. Decoder 40 conveniently provides output 402 to preload register 46 or output 403 to counter 30 or both, and output 404 to the remainder of radio 10 (not shown in FIG. 4) and output 406 to address generator 38. As is more fully explained in connection with FIGS. 5–6, decoder 40 interprets instructions delivered from memory 42 and issues commands to elements 18, 24, 30, 38, 46 according to the nature of each instruction.

Address generator 38 receives, for example, an eend-of-instructioni messages from decoder 40 and generates a command on output 381 to load the next instruction from memory 42 into decoder 40 and burst event generator 36, depending on the instruction. Also, depending on the instruction operand, decoder 40 can issue an instruction or trigger signal to peripheral 24 on line 405 or to another portion (not shown) of radio 10 on output 404. Peripheral 24 is intended to represent any other portion of radio 10. Line 404 can also couple to transceiver 22.

Counter 30 receives timing clock signals on input 31 and provides event timing counts on line 302 to burst event generator 36. Burst event generator 36 tells decoder 40 to execute an instruction according to the timing count received from counter 30 and execution TIME count T(i), and according to one of two modes of operations of burst event generator 36.

TIME count T(i) is loaded into burst event generator 36 from TIME portion 45 of instruction memory 42 in response to an address generated by address generator 38.

In the first mode of operation, burst event generator 36 tells decoder 40 to execute an instruction when its execution TIME count T(i) matches the timing count received from counter 30. If counter 30 was reset and if there are any skipped instructions, the burst event generator tells decoder 40 to execute the skipped events during the next communication frame.

In the second mode of operation, and assuming that counter 30 is a count up counter, then burst event generator 36 tells decoder 40 to execute an instruction if its execution TIME count T(i) is equal or smaller then the timing count received from counter 30.

As long as the timer 30 is not reset, burst event generator 36 tells decoder 40 to execute an instruction when its execution Time count T(i) equals the timing count received from the counter 30. If counter 30 is reset and there are instructions having execution times which are a smaller then the timing count value from counter 30, then burst event generator 36 tells decoder 40 to execute these instruction, and these instructions are executed immediately and in a sequential order, wherein each instruction is executed after the previous instruction is executed. This continues until there are no more instructions to be executed or until the execution TIME count T(i) of an instruction is greater then timing count received from counter 30. Then, burst event generator 36 tells decoder 40 to execute an instruction at its execution TIME count T(i).

In the second mode, and if counter 30 is a count-down counter then burst event generator 36 works as described above but it tells decoder 40 to execute an instruction if its execution TIME count T(i) is equal or bigger then the timing count received from the counter 30. For convenience and for purpose of explanation only and not intended to be limiting, counter 30 is further regarded a count-up counter.

Figure 5:
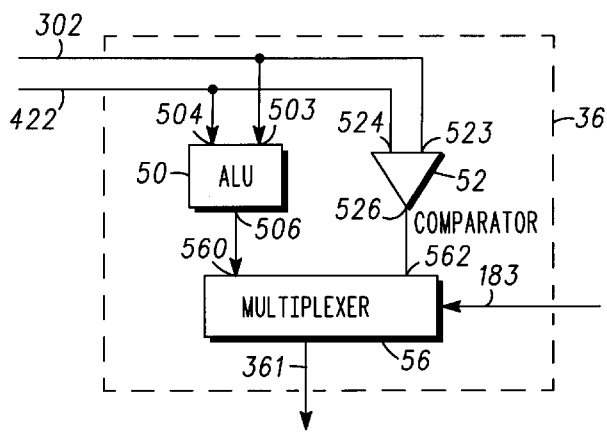
FIG. 5 is a more detailed schematic diagram of a portion of the radio of FIG. 3.

FIG. 5 is a more detailed schematic diagram of burst event generator 36 apparatus of FIG. 3. Burst event generator 36 comprises:

Arithmetic Logic Unit (i.e.—ALU) 50, having first input 504 coupled to output 422 of instruction memory 42, for receiving execution TIME count T(i), and second input 503 coupled to output 302 of counter 30 for receiving timing count of counter 30. ALU 50 has output 506. ALU 50 substracts execution TIME count T(i) from the timing count received from counter 30 and outputs a signal if execution TIME count T(i) is equal or smaller then the timing count received from counter 30. Output 506 of ALU 50 is preferably the borrow bit of the most significant bit of ALU 50.

Comparator 52, has input 524 coupled to output 422 of instruction memory 42, for receiving TIME T(i), and input 523 coupled to output 302 of counter 30 for receiving the timing count from counter 30, and has output 526. Comparator 52 outputs a signal when execution TIME count T(i) equals the timing count received from counter 30.

Multiplexer 56, having first data input 560 coupled to output 506 of ALU 50, has second data input 562 coupled to output 526 of comparator 52, and has control input 183 and output 361.

Control unit 18 sends a signal to control input 183 of multiplexer 56. this control signal determines in which two modes the burst event execution is operating. This control signal results in a selection of one of two multiplexers inputs 560 and 562 respectively. For example, in the second mode, input 560 is selected and in the first mode, input 562 is selected. The selected input of multiplexer 56 is coupled by multiplexer 56 to output 361 of burst event generator 36. Those who are skilled in the art understand that ALU is a general term used to define any logic array that can substracts or otherwise arithmetically manipulate a plurality of values.

Figure 6:
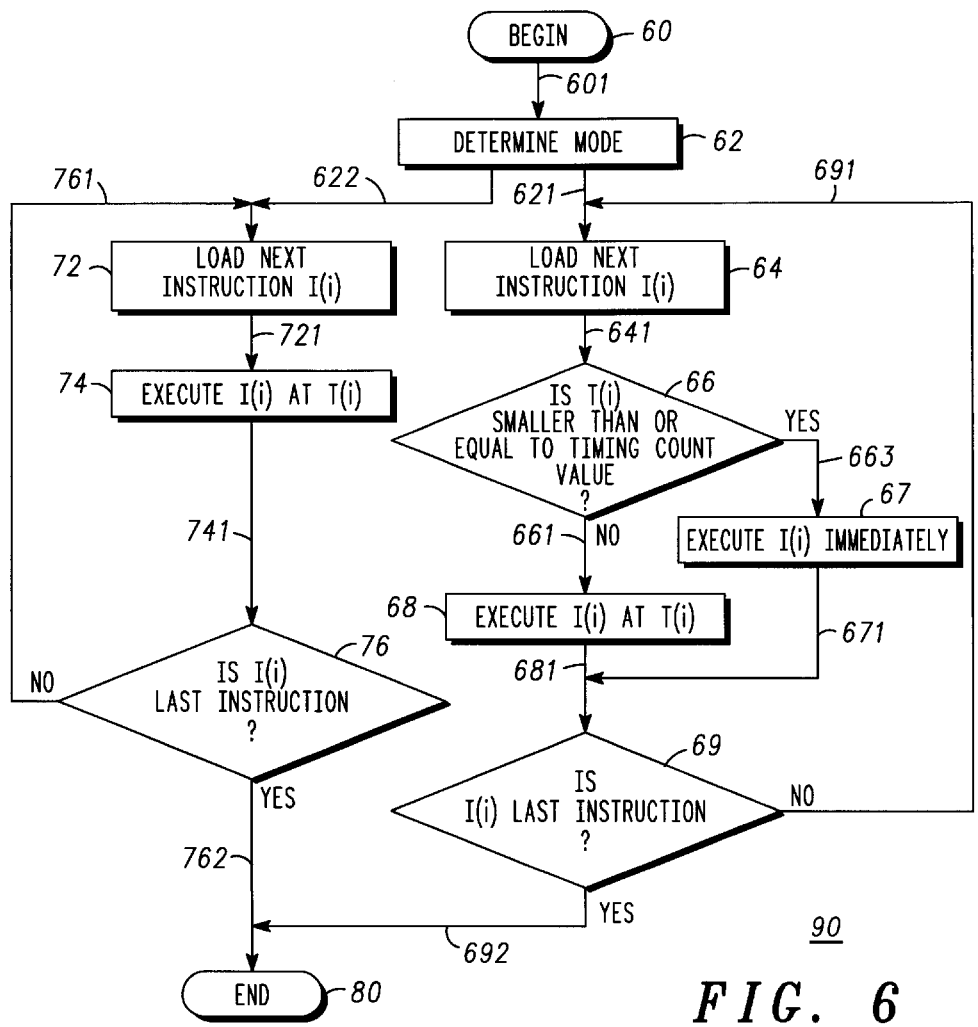
FIG. 6 is a flow diagram of a method for handling instruction bursts and synchronization, according to a preferred embodiment of the present invention.

FIG. 6 is a flow diagram of method 90 for burst event execution, according to a preferred embodiment of the present invention. As indicated by path 601, BEGIN step 60 is followed by 'DETERMINE MODE' step 62, in which control unit 18 determines in which of the two modes of operation, execution logic 32 will operate.

In the first mode, as indicated by path 622, execution logic 32 reads a first instruction at 'LOAD NEXT INSTRUCTION I(i)' step 72. As indicated by pathes 721, 741, 761 and 762, after an instruction I(i) is executed, and while there are more instructions I(i) to execute, the instruction following the instruction which was currently executed is read during step 72, and is executed during step 74.

For convenience of explanation we will assume that there are N instructions I(i), where i is an index having values of 1 to N. Each of the N instructions I(i) can cause various radio operations to occur within a given communication frame and are conveniently determined by the radio programmer and may or may not be influenced by the radio user.

As indicated by path 721, during 'EXECUTE I(i) AT T(i)' step 74, N instructions I(i) are executed by execution logic 32 at their time of execution T(i), by logic 14, 16, 32 as described in connection to FIGS. 1–4, for i<N.

As indicated by path 741, after executing an instruction I(i), the execution logic 32 goes to 'IS I(i) LAST INSTRUCTION ?' query step 76 and checks if the instruction I(i) which was executed during step 74 was the last instruction. As indicated by path 761, if the answer is 'NO', execution logic 32 goes to step 72 for reading the next instruction. As indicated by path 762, if the answer is 'YES', execution logic 32 goes to END step 80. During step 80 process 90 terminates until a subsequent frame or other event occurs thereby causing process 90 to repeat with the same or different instructions I(i).

In the second mode, as indicated by path 621, execution logic 32 reads a first instruction at LOAD NEXT INSTRUCTION I(i) step 64. As indicated by pathes 641, 661, 663, 681, 671, 691 and 692 and steps 64, 66, 67, 68 and 69, after an instruction I(i) is executed, and while there are more instructions I(i) to execute, the instruction following the instruction which was currently executed is read during step 64, and it is executed during step 68 or 67.

As indicated by path 641, after execution logic 32 loads an instruction the process goes to query 'IS T(i) SMALLER THEN OR EQUAL TO TIMING COUNT VALUE ?' step 66 in which the time of execution T(i) is compared to the timing count signal received from counter 30. As indicated by path 661, if the answer is 'NO' then instruction T(i) is executed at time of execution T(i), during 'EXECUTE I(i) AT T(i)' step 68. As indicated by path 663, if the answer is 'YES', then instruction I(i) is executed immediately during 'EXECUTE I(i) IMMIDIATLY' step 67. As explained in connection to FIG. 3, a time T(i) associated with an instruction I(i) can be smaller then or equal to timing count signal as a result of a counter 30 reset or other events.

As indicated by pathes 681 and 671, after executing an instruction I(i), during step 67 or 68, the execution logic 32 goes to 'IS I(i) LAST INSTRUCTION ?' query step 69 and checks if the instruction I(i) which was executed during step 67 or 68 was the last instruction. As indicated by path 691, if the answer is 'NO', the execution logic 32 goes to step 64 for reading the next instruction. As indicated by path 692, if the answer is 'YES', execution logic 32 goes to END step 80. During step 80, process 90 terminates until a subsequent frame or other event occurs cause process 90 to repeat with the same or different instructions I(i).

While it is assumed for convenience of explanation that instructions I(i) are each executed during a single clock cycle and are all executed during a single communication frame, this is not required. Also, some or all of instructions I(i) can be repeated in subsequent communication frames.

It will be understood by those skilled in the art that various changes in form and detail can be made without departing from the spirit and scope of the invention which is determined by the claims that follow and that the application of the present invention is not limited to radios but can be applied roadly to many kinds of electronic apparatus.

What is claimed is:

1. An electronic apparatus comprising:
   a timing unit providing a timing count signal within the apparatus;
   a control unit coupled to the timing unit;
   a memory coupled to the control unit and timing unit for receiving a series of instructions I(i) from the control unit, the instructions I(i) comprising operand instructions O(i) for controlling operations of the apparatus and time of execution T(i) specifying when each O(i) is to be executed, where i is an index having values 0 to N; and
   wherein, the timing unit compares between its timing count signal and a time of execution T(n) and if its timing count signal is bigger than the time of execution T(n), it executes instruction I(n) immediately, else, it executes instruction I(n) a time specified by time of execution T(n), where n is one of the index values i.

2. The apparatus of claim 1 wherein the timing count signal is greater than time of execution T(n), as a result of resetting the timing unit.

3. The apparatus of claim 1, wherein the apparatus is a radio and the timing unit is reset in order to synchronize between the radio and a base station.

4. The apparatus of claim 1, wherein the timing unit works in two modes, herein:
   in a first mode each instruction I(n) is executed at time of execution T(n) and in a second mode the timing unit compares its timing count signal and the time of execution T(n) and if its timing count signal is greater than the time of execution T(n), it executes instruction I(n) immediately, else, it executes instruction I(n) at time of execution T(n); and
   wherein the control unit determines in which of the two modes the timing unit operates.

5. The apparatus of claim 4, wherein the timing unit comprises:
   a decoder coupled to the memory and the control unit, for executing instruction operands, stored in the memory;
   an address generator coupled to the memory and to the decoder, for generating address of instructions, stored in the memory;
   a counter coupled to the control unit and the decoder, for outputting timing count signals and triggering events within a communication frame;
   a burst execution generator coupled to the decoder, to the counter and to the memory, for comparing time of execution T(n) stored in the memory to timing count signals received from the counter;
   wherein in the first mode, the decoder executes an instruction I(n), at time of execution T(n); and
   wherein in the second mode, if the timing count signal is bigger or equal to the time of execution T(n), the decoder executes instruction I(n), immediately.

6. The apparatus of claim 5, wherein the burst execution generator comprises:
   an ALU, coupled to the memory and to the counter, for comparing the time of execution T(n) to the timing count signal received from the counter, wherein the ALU outputs a signal indicating if the time of execution T(n) is equal or smaller than the timing count signal;
   a comparator, coupled to the memory and to the counter, for comparing the time of execution T(n) to the timing count signal, wherein the comparator outputs a signal indicating if the time of execution T(n) is equal to the timing count received from counter;
   a multiplexer, coupled to the control unit, the comparator and the ALU, for choosing between the comparator and the ALU outputs according to a control signal sent by the control unit; and
   wherein in the first mode, the comparator is chosen and in the second mode, the ALU is chosen.

7. A method for operating an electronic apparatus having instruction execution logic and a timing unit comprising the steps of:
   loading a set of N instructions I(i) wherein each instruction I(i) comprises an operand O(i) and a time of execution T(i) for the operand, where i is an index, where i<N; and
   checking if a time of execution T(n) is greater or equal to a timing count signal received from the timing unit and if so, then executing instruction I(n) immediately, else executing instruction I(n) at the time of execution T(n), where n is one of the index values i.

8. The method of claim 7, wherein the apparatus has a further mode of operation in which it executes instruction I(n) at the time of execution T(n), and wherein the mode of operation is determined before loading the set of instructions.

9. The method of claim 7 wherein the timing count signal received from the timing unit is greater than time of execution T(n) as a result of resetting the timing unit, and wherein the timing unit is reset in order to synchronize between radio and base station.

10. A method for operating an electronic apparatus having instruction execution logic and a timing unit comprising the steps of:
    loading a set of N instructions I(i) wherein each instruction I(i) comprises an operand O(i) and a time of execution T(i) for the operand, where i is an index, where i<N; and checking if a timing count signal is bigger than a time of execution T(n), and if so, then executing instruction I(n) immediately, else executing instruction I(n) at a time specified by the time of execution T(n), where n is one of the index values i.

11. An electronic apparatus comprising:

a timing unit providing a timing count signal within the apparatus;

a control unit coupled to the timing unit;

a memory coupled to the control unit and timing unit for receiving a series of instructions I(i) from the control unit, the instructions I(i) comprising operand instructions O(i) for controlling operations of the apparatus and time of execution T(i) specifying when each O(i) is to be executed, where i is an index having values 0 to N; and wherein, the timing unit compares between its time count signal and a time of execution T(n) and if the time of execution T(n) is greater or equal to the timing count signal it executes instruction I(n) immediately, else it executes instruction I(n) at a time specified by time of execution T(n), where n is one of the index values i.

* * * * *